United States Patent [19]

Osterlund

[11] Patent Number: 5,034,914
[45] Date of Patent: Jul. 23, 1991

[54] OPTICAL DISK DATA STORAGE METHOD AND APPARATUS WITH BUFFERED INTERFACE

[75] Inventor: Steven W. Osterlund, North Kingstown, R.I.

[73] Assignee: Aquidneck Systems, International, Inc., North Kingstown, R.I.

[21] Appl. No.: 207,590

[22] Filed: Jun. 16, 1988

Related U.S. Application Data

[63] Continuation-in-part of Ser. No. 037,749, Apr. 13, 1987, Pat. No. 4,775,969, which is a continuation-in-part of Ser. No. 863,564, May 15, 1986, abandoned.

[51] Int. Cl.⁵ .................. G06F 13/00; G11B 7/013
[52] U.S. Cl. .................. 364/900; 364/952.31; 364/939.3; 364/952.1; 360/72.2; 360/48; 369/32; 369/59
[58] Field of Search ............. 364/200, 900 MS File; 369/116, 59, 60, 32, 272; 365/234; 360/72.2, 48, 71

[56] References Cited

U.S. PATENT DOCUMENTS

| | | | |
|---|---|---|---|
| 3,400,371 | 9/1968 | Andahl | 364/200 |
| 3,400,372 | 9/1968 | Beausoleil | 364/200 |
| 3,629,860 | 12/1971 | Capozzi | 364/200 |
| 4,001,883 | 1/1977 | Strout | 360/48 |
| 4,089,027 | 5/1978 | Grigoletti | 360/72.2 |
| 4,094,013 | 6/1978 | Hill et al. | 365/234 |
| 4,229,808 | 10/1980 | Hui | 369/48 |
| 4,310,883 | 1/1982 | Clifton et al. | 364/200 |
| 4,321,635 | 3/1982 | Tsuyuguchi | 360/72.2 |
| 4,398,227 | 8/1983 | Anderson | 360/71 |
| 4,467,421 | 8/1984 | White | 364/200 |
| 4,486,870 | 12/1984 | Pettigrew | 369/32 |
| 4,490,747 | 12/1984 | Yokoyama | 358/296 |
| 4,496,997 | 1/1985 | Ohtsuki | 360/13 |
| 4,531,166 | 7/1985 | Anderson | 360/73.04 |
| 4,535,439 | 8/1985 | Satoh | 369/275 |
| 4,541,019 | 9/1985 | Precourt | 360/15 |
| 4,545,044 | 10/1985 | Satoh | 369/32 |
| 4,562,577 | 12/1985 | Glover | 371/38 |
| 4,587,643 | 5/1986 | Monen | 369/32 |
| 4,633,393 | 12/1986 | Rundell | 364/200 |
| 4,680,653 | 7/1987 | Ng | 360/72.2 |
| 4,682,318 | 7/1987 | Busby | 369/59 |
| 4,775,969 | 10/1988 | Osterlund | 369/53 |
| 4,791,623 | 12/1988 | Deiotte | 369/59 |

OTHER PUBLICATIONS

Jaworski, "Lasers Anticipate Mass (Storage) Appeal", Hardcopy Magazine, Feb. 1986, pp. 43-49.
Freeman, Jr., "Optical Recording Comes of Age", Mini-Micro Systems, Apr. 1985, pp. 65, 66 & 69.

(List continues on next page.)

Primary Examiner—Michael R. Fleming
Assistant Examiner—Gopal C. Ray
Attorney, Agent, or Firm—Pennie & Edmonds

[57] ABSTRACT

An optical disk data storage system and method are disclosed. In a data storage or "write" operation, up to a fixed number of variable-length records are written to the optical disk in close proximity to an embedded directory, which stores record length information describing the records associated therewith. A high-level directory is constructed providing a list of addresses for the embedded directories. The embedded directories comprise up to a fixed maximum number of entries each indicating the length in bytes of a corresponding record. In a data retrieval or "read" operation, the high-level directory is first accessed to determine the addresses for the embedded directories, with reference to positional information permanently written to the disk. Bytes of data are then counted in accordance with the record length stored by the embedded directory to access the record sought by the host computer. In this way, varying-length records can be efficiently stored on an optical disk divided into fixed-length data storage sectors. All data is buffered in random access memory during both read and write data transfer operations.

30 Claims, 9 Drawing Sheets

Warren, "Optical Storage Shines on the Horizon", *Mini-Micro Systems*, Dec. 1985, pp. 68-70, 73, 74, 75, 76, 79 & 80.

Welch, "A New Stab At Data Storage", *Venture*, Feb. 1986, pp. 66, 68 & 70.

Meng, "Optical Disks Slip On Compatibility", *Digital Design*, Jan. 1986, pp. 28, 29, 32, 34, 36 & 37.

Tucker, "Mass Storage Goes Optical", *Advanced Imaging*, Nov. 1986, pp. A19-A24.

Rathmann, "Dynamic Data Structures On Optical Disks", Computer Science Department, Stanford University, pp. 175-180.

Fujitani, "Laser Optical Disk: The Coming Revolution In On-Line Storage", Communications of the ACM, Jun. 1984, pp. 546-554.

Warren, "Software Tools, Utility Drive Optical Disks", *Mini-Micro Systems*, Dec. 1986, pp. 33, 34, 37, 40, 43 & 44.

Rothchild, "Optical Storage Moves Closer To Mainframes", *Computerworld*, May 7, 1984.

Rothchild, "CD-ROM and Write-Once Optical Storage-Right Now!", *Optical Memory News*, Jul.-Aug. 1985.

M. J. Mitchell, Jr., "Diskette Load/Dump Control", IBM Technical Disclosure Bulletin, vol. 20, No. 4, Sep. 1977, pp. 1359-1361.

FRAGMENTATION BLOCK
(ONLY PRESENT IF NUMBER OF FRAGMENTATION ENTRIES FIELD
IN PRECEDING EMBEDDED DIRECTORY IS NON-ZERO)

A BLOCK ON DISK EQUALS AT LEAST 1024 BYTES
OF 8 BITS EACH

NOTE: SEQUENCES OF BLOCKS THAT ARE LONGER THAN $FFFF_{HEX}$
CAN BE EXPRESSED BY CONTINUING THE COUNT AN
ADDITIONAL ENTRY AND PUTTING A ZERO IN THE
COMPLEMENTARY FIELD OF THAT ENTRY

OPTICAL DISK DATA STORAGE METHOD AND APPARATUS WITH BUFFERED INTERFACE

PRIOR APPLICATIONS

This is a continuation-in-part of U.S. Pat. Application Ser. No. 37,749, filed Apr. 13, 1987, now U. S. Pat. No. 4,775,969, which was a continuation-in-part of Ser. No. 863,564, filed May 15, 1986, and now abandoned.

BACKGROUND OF THE INVENTION

This invention is directed to optical disk storage systems and is more particularly directed to a new and improved embedded directory technique for storing data on an optical disk to permit rapid access thereto.

For general information concerning the field of optical data storage and the associated hardware, reference may be made to the following articles:

(1) May 7, 1984 edition, *Computerworld*, article entitled "Optical Storage Moves Closer to Mainframes";

(2) April, 1985 edition, *Mini Micro Systems*, article entitled "Optical Recording Comes of Age"; and (3) December, 1985 edition, *Mini Micro Systems*, article entitled "Optical Storage Shines on the Horizon"

One object of this invention is to efficiently solve the specific problems associated with using an optical disk storage system to emulate a magnetic tape storage system in a "plug-compatible" manner. Numerous problems are encountered in such an effort, due both to the differing natures of the media and to the data organization practices which have become customary in tape storage applications.

More particularly, as conventionally implemented, a single reel of magnetic tape is commonly used to store a single "file" of data, that is, an entire data set pertaining to a particular subject, e.g., a payroll file, an employee file or the like. Within each file, the data is typically divided into "records", the length of which is not fixed. For example, each record may relate to a particular employee. Normally each record in the file is set off on the tape by "preamble" and "postamble" indicators of specified format; successive records are separated by "inter-record" gaps.

In some cases, a single reel of tape may store several files, that is, several data sets accessed separately by an application program running on a host computer. If plural files are stored on a single tape, they may be divided by "file marks", as discussed below; however, the presence of a file mark does not indicate the end of a file per se. For the purposes of the present invention, it is immaterial whether one or several files are stored on a single reel of tape.

Typically, data is written to the tape record-by-record under direct control of a host computer. When the host subsequently desires to retrieve one of the records, it first directs that a particular tape be mounted, that is, so that the single file typically found on each reel of tape can be accessed. The host then directs the tape drive to obtain access to the "next" record. In response to such a command, the tape drive will typically read the next record into a random-access memory or other buffer for subsequently supplying it to the host; less sophisticated drives may simply advance the tape to a point corresponding to the beginning of the next record. If the host is not interested in a particular record, it directs instead that the next record be accessed, and so on. Thus, if the host in fact needs access to the two hundredth record on the tape, 200 such "next record" instructions must be forwarded from the host to the tape drive and executed. Obviously, this is very time consuming. Normally, of course, the intrinsic sequential nature of tape storage is turned to advantage by use of tape in connection with programs (e.g. payroll processing) in which the records can conveniently be accessed in sequence, one by one.

In order to partially alleviate this problem, it is conventional for the host computer to direct that a so called "file mark", consisting of a predetermined sequence of bits, be written to the tape from time to time, that is, at unspecified intervals between records. If the host desires to skip over a portion of the tape, it can then direct that the tape be advanced to the next file mark. The drive can advance the tape until it detects the unique file mark sequence. If the host "knows" that the record of interest is between the second and third file marks, for example, it can direct that the tape advance to the first file mark, and when this has been done, to the second file mark; the host can then direct that the tape successively read individual records, as above. Again, this process is relatively cumbersome and time consuming.

As indicated above, one object of this invention is the emulation of a tape drive using optical disk storage media. It is important that the optical disk according to the invention be "plug-compatible" with a tape drive; that is, the optical drive according to the invention must be connected to a host computer precisely as is a conventional tape drive. In this way, the optical disk can be employed without requiring any modification to the host operation or, application software. Clearly, in order to do so the optical drive must respond to all of the commands which are conventionally directed to tape drives, as outlined above, and in order to be attractive to users must provide a substantial performance advantage.

At present, all optical disk media of which the present inventor is aware define a single spiral "track", although concentric tracks could also be employed. Radially-extending "hard sectors", provided at manufacture, are spaced circumferentially around the disk and divide the spiral track into "sectors". Typically 1,024 bytes per sector may be stored on each track. The optical drive is provided with a controller operable so that its read/write head can access the disk at the beginning of any sector; hence reading and writing operations can begin at a number of "sector locations" equal to the number of the hard sectors on the disk (on the order of 32) times the number of the essentially concentric rings (on the order of 32,000) made by the spiral track.

One way of writing varying-length tape-type records to an optical disk would be to start each individual record at a sector location. In that way, whenever the host directed that the next record be accessed, the optical disk could simply begin reading at the subsequent sector. However, many tape record entries are very short, e.g., a single byte may be written as a record. In such cases, essentially the entire storage capacity represented by the sector would be wasted.

It will be recognized, of course, that magnetic disk storage is also extremely popular. Magnetic disks are also typically divided into sectors, but use concentric rather then spiral tracks. It might be considered that magnetic disk storage techniques could be usefully applied to optical disk storage. However, this actually is not the case due to the varying characteristics of magnetic and optical storage systems, for the following reasons.

Conventionally, for a disk of given size, an optical disk can store up to ten times as much data as can a magnetic disk. However, a magnetic disk can be repetitively erased and rerecorded, such that if the contents of a given file change over time, the obsolete data is simply erased and rewritten. This cannot be done with present-day commercially-available optical disk media and storage systems, which do not allow erasure.

Erasing of obsolete blocks of data, incidentally, is typically not practiced on tape, although erasing itself is readily accomplished. Instead, the new data is simply written to the end of the tape and a record is maintained (e.g. by the application program) indicating which data blocks are current and which are obsolete, such that those which are obsolete are simply ignored. This is preferred because the time consumed in rewinding the tape to the location of the obsolete record, record-by-record, as discussed - is more costly than simply using a new section of tape. An exception to this practice is discussed below.

Another important distinction between optical and magnetic disk storage is that the average "head seek" time required by state of the art magnetic read/write heads to move radially in order to access various portions of the disk is much shorter than that of the comparable optical disk read/write head units. This is simply because the magnetic read/write head assembly of a magnetic disk is typically less massive than the laser read/write head assembly associated with an optical disk. The magnetic head assembly can therefore be moved much more quickly to a given area of the disk for a read/write operation than can an optical head assembly. Accordingly, it is desired to provide a memory structure and organization for an optical disk in which head seeks are minimized insofar as possible.

The fact that magnetic disks allow repeated erasure of and rapid access to varying points of the disk has caused disk memory organization practices to develop substantially differently from those employed in connection with tape storage. As indicated above, on a given tape a single file comprising a number of individual "records" is normally stored, and a host computer accesses the file record-by-record, that is, sequentially. On a magnetic disk, by comparison, data is typically accessed only file-by-file. For example, the entire payroll file might be read from a disk into a host computer for processing in a single operation. Where a particular file extends beyond a particular sector (the beginning points of the sectors again being the only points at which the magnetic disk can accurately be addressed a directory also stored on the magnetic disk provides a "map" according to which the read/write head can then "jump" from the end of that sector to the beginning of the sector at which the next portion of the file is stored. Typically, this can be accomplished sufficiently quickly that the host does not experience a delay in accessing all of the file. Accordingly, even if an application program does not require all of the data contained in an entire file stored on a magnetic disk, but only a portion thereof, which might or might not correspond to a "record" as stored on tape, it simply accesses the entire file from the disk and then selects the individual portion required therefrom when the data has been stored in the host.

The above discussion serves to illustrate why the storage organization arrangements used for magnetic tape and disk storage cannot appropriately be applied to optical disk storage, even where a particular sequentially-organized data set to be stored on the optical disk might otherwise have been suitable for storage on tape. Notably, the fact that tape records are conventionally accessed record-by-record means that it would be inappropriate to assign an entire sector on the optical disk to each record; if the record were relatively short, most if not substantially all of the sector would be wasted. The variable-length tape records would rarely correspond to the fixed length of the sectors, such that incomplete usage would be very common.

More specifically, note that data is stored on tape record-by-record because there is no alternative to doing so; on tape, there are no permanently-written equivalents of the hard sectors on the disk which can be used to provide indexing to a particular record, for example. File marks can be written, as described above, but as presently employed this is done only in response to specific host commands. Accordingly tape records must be delimited by preamble and postamble information, so that they can be reliably counted.

Writing data to tape record-by-record does permit flexibility of record length. Media organized into blocks of fixed length, such as magnetic or optical disks, do not have this flexibility. Accordingly, to store tape-type records on media divided into fixed-length blocks (i.e., either optical or magnetic disks) is complex.

It is understood that at least in some tape systems variable-length records are also divided into fixed-length blocks for convenience in storage; see U.S. Pat. Nos. 4,398,227 and 4,531,166 to Anderson. However, if plug compatibility is to be retained, the blocks must be "transparent" to the host computer, and the random record length characteristic preserved. Hence this does not solve the problem noted above.

U. S. Pat. No. 4,467,421 to White discloses one approach to the storage of sequential, tape-type records on magnetic disks. However, this involves extensive reprogramming of the host computer, and is thus not appropriate in the plug-compatible environment primarily addressed by the present invention. Moreover, the White approach is directed principally to very large mainframe host computers.

On the other hand, to organize an optical disk in the way in which magnetic disks are normally organized would be highly inappropriate. Data stored on magnetic disks is accessed file-by-file, with numerous "head seeks" between portions of the file stored in various sectors, as indicated. Such a scheme would be inefficient in an optical disk system due to the relatively slow motion of current optical read/write head assemblies. In effect, in such case the sequential nature of the spiral track on an optical disk would not be employed gainfully. Moreover, if an optical disk were to be configured to be functionally-compatible as well as plug-compatible with a magnetic disk, the fact that data stored on magnetic disks is frequently erased and overwritten would mean that numerous obsolete copies of large volumes of data would be stored on the optical disk, since no erasure is possible. This would rapidly fill up even the high capacity optical disk systems now available. Further, to emulate a magnetic disk to a host would involve numerous difficulties with respect to plug-compatibility.

It would of course be possible to provide an interface scheme for mating a computer with an optical disk drive in a manner designed to take advantage of the characteristics of the optical media. However, to do so in a manner such that the device was not plug-compatible with a class of existing storage devices would prevent the optical disk system from being useful with preexisting computer systems, limiting the market for the optical disk.

Accordingly, it can be seen that a new way of recording data efficiently on an optical disk, while retaining plug-compatibility with a conventional magnetic data storage device, such as a tape drive, is needed.

BRIEF DESCRIPTION OF THIS INVENTION

This invention is directed to a new and improved method and apparatus for storing user or "customer" data, typically organized as a sequence of data records, and record structure data, that is, data describing the user data records, (all of which is hereinafter sometimes referred to as information) on an optical disk. Optical disks as constructed today comprise concentric tracks or a spiral track in which physical changes, e.g., bubbles are formed by a laser writing head to record information. The information is read out for example by measuring reflected light from the tracks.

In the method and apparatus for storing data according to the invention, record structure data is generated based on the data records to be stored and is distributed on the disk so that it is in close physical proximity to the optical disk read/write head when it is needed.

With this system and method, the optical disk is able to effectively emulate magnetic tape storage. The method of the invention also enables the optical disk to be used efficiently for storage of data not particularly directed to magnetic storage devices.

According to the present invention, a high-level directory is begun during initial writing of data to an optical disk. The high-level directory relates a file to a number of "embedded directories" interspersed with the data on the disk, and written to the disk substantially simultaneously with the data. The "embedded directories" each provide an index to a number of associated data records, all part of a single corresponding file. The fact that the embedded directories are interspersed with the data reduces the number of long "head seeks" required to access a particular record. Preferably, the embedded directories are written to the disk immediately following the data records to which they correspond. The high-level directory is written to a predetermined location on the disk, so that it can be located reliably; entries are added to the high-level directory as data is written to the disk.

In order to allow emulation by the optical disk of the record-by-record response of a tape drive to typical host commands, the embedded directories each contain a sequence of record length identifiers. Each record length identifier simply consists of a number equal to the number of bytes of a corresponding record having been written to the optical disk by the host. The records themselves are written contiguously; that is, the preamble and postamble and inter-record gaps found on tape are eliminated, such that very high density of data storage on the disk is achieved.

In an exemplary embodiment each sector contains 1,024 bytes of data. Each embedded directory occupies one sector; header and other information required to identify each embedded directory takes the first 24 bytes of the sector. The remainder of the sector containing the embedded directory consists of record length data. Each record length data item is assigned two bytes in the embedded directory, such that each embedded directory is capable of containing 500 record length identifiers corresponding to 500 stored records.

The sector address of each of the embedded directories is stored in the high-level directory, and an identification of the file to which the records corresponding to each of the embedded directories belong is stored therewith. When a host subsequently requires access to a particular file, the optical disk storage control system accesses the high-level directory to determine the starting address of the first embedded directory corresponding to that file. When the host subsequently desires to read a particular record, the optical disk control system accesses the corresponding embedded directory—which follows the data to which it corresponds—to determine the number of bytes of data preceding the particular record sought, starting from the sector after the preceding embedded directory, and the number of bytes of the particular record sought. The starting point of the particular record sought can then be located simply by counting out a number of bytes of data corresponding to the total length of the preceding records. The specific record sought can then be supplied by counting out a number of bytes of the copied data equal to the length of the record sought.

In the preferred embodiment, the system of the invention includes a random-access memory (RAM) buffer in which all data is stored during its transfer from the host to the optical disk, and vice versa. During a write operation, while the records to be stored on the optical disk are stored in the RAM buffer, the embedded directory corresponding to a particular group of records is constructed. When the embedded directory corresponding to the group of records has been constructed, it is stored on the optical disk following the corresponding records. Similarly, during a read operation directed at a particular record, the embedded directory is first consulted to determine the number of bytes preceding the record sought. The bytes preceding a particular record sought by the host then are counted to locate the record, after up to the entire group of records corresponding to the embedded directory has been copied from the optical disk to the RAM buffer.

As mentioned above, the host computer may also direct that file marks be written to the tape from time to time. According to the invention, file marks are written as zero-length records in the corresponding embedded directory. As noted, the locations of the embedded directories are stored in the high-level directory. When the host directs the tape to skip ahead to the next file mark, the entries in the embedded directories are reviewed. The zero-length entries in the embedded directory then indicate the location of the file marks.

A defective area on an optical disk is sometimes encountered. If this occurs, a "fragmentation map" is constructed which is stored in the sector immediately following the embedded directory. The map contains the lengths of the "good" and "bad" portions of the disk. This information is taken into account when counting data during the reading of the data back to the host, such that the existence of the bad data blocks need not be communicated to the host.

The use of the embedded directories containing the length of each record thus allows a particular record to be accessed simply by counting bytes of data on the disk as they are read. The data need not be examined, e.g., to determine whether a particular byte is preamble or postamble information or the like. The ultimate result is that data "segments", consisting in the presently-preferred embodiment of up to 500 records of any length desired, are stored in sequence, each associated with a single embedded directory. [In the exemplary embodiment, the maximum record length is 64 k bytes—1, to conform to the largest record length value which can be stored as two bytes in the embedded directory.] The data is stored contiguously without wastage of space due to preamble or postamble requirements or to inter-record gaps. The only space wasted is that which may exist in a single sector between the last record corresponding to a particular embedded directory and the beginning of the next sector, in which the corresponding embedded directory is located.

The result is that random length data records may be stored efficiently on an optical disk device which is divided physically into sectors of fixed storage capacity.

Similarly, the length of a "file" is essentially unlimited by the present system, except that at minimum each file will require an embedded directory and at least one record. Accordingly, each file entry will consist of at least two sectors, one for the embedded directory and one for the at least one data record. The maximum length of a file is unlimited, as however many embedded directories are needed to list the lengths of its records may be written interspersed with the data, and may have their sector addresses recorded in the high-level directory.

More particularly, according to the preferred embodiment of the invention, the high-level directory is written starting from one end of the spiral track on the optical disk, and the data and embedded directories are written starting from the other; disk storage limitations are encountered only when the two intersect. In this way no fixed allocation of space between the high-level directory and the data need be made, and the allocation which ultimately occurs is the most efficient possible.

Before starting the transfer of tape records to optical disk, a high-level directory entry is constructed in microprocessor memory that contains the address of the next available portion of the disk surface available for data storage. Construction of a high-level directory for this purpose is generally conventional in optical disk systems. As data is written to the RAM and thence to the optical disk, record length and bad block information is added to an embedded directory that is also being constructed in memory. The data records are transferred from the RAM to the disk in blocks of sizes chosen for convenience with respect to the particular disk. After, for example, 500 records have been transferred from magnetic tape, the embedded directory (and fragmentation block, if necessary) is written to the next good area on the disk. After each "segment", consisting of a number of data records and the corresponding embedded directory, has been successfully written, the embedded directory address is appended to a table that is temporarily stored in a random access memory comprised by the disk controller. This process is repeated until the data transfer operation is completed.

In a typical operation, after all the segments of records have been written to the RAM, and the associated embedded directories have been constructed, an operator-initiated "Tape Dismount" command is encountered, meaning that the file has been fully transferred. At that point, all of the records stored in the buffer memory and the corresponding embedded directories are written to the optical disk. The high-level directory entries corresponding to the embedded directory locations are then written by the microprocessor to the disk adjacent to the location of the last high-level directory entry written to the disk.

All of the data which had been directed to tape by the host for storage is treated as a single file in the high-level directory structure. The high-level directory, comprising a table of embedded directory addresses, can be used to locate any segment of records within the file. This serves as a convenient way to locate the embedded directory blocks; however, if this entry becomes damaged, the data records can still be recovered using pointers in the embedded directories. File marks can be used to divide a file as thus defined into "subfiles" if needed by an application program.

Numerous advantages of this arrangement will be apparent to those of skill in the art. For example, in one preferred embodiment of the invention, in which the optical disk is to be plug-compatible with a tape drive in which individual records are erased and overwritten (that is, contrary to the usual practice) the optical disk controller of the invention can write the corrected record to a new region of the disk along with an appropriate "super-directory" entry stored as part of the high level directory. The fact that this record is to be substituted for one stored previously is detected from the "super-directory" entry and employed if the record is sought by the host. This allows apparent erasure and preserves plug-compatibility. Other aspects and advantages of this storage structure will be discussed below.

BRIEF DESCRIPTION OF THE DRAWINGS

The invention will be better understood if reference is made to the accompanying drawings, in which.

DETAILED DESCRIPTION OF THE INVENTION

Figure 1:
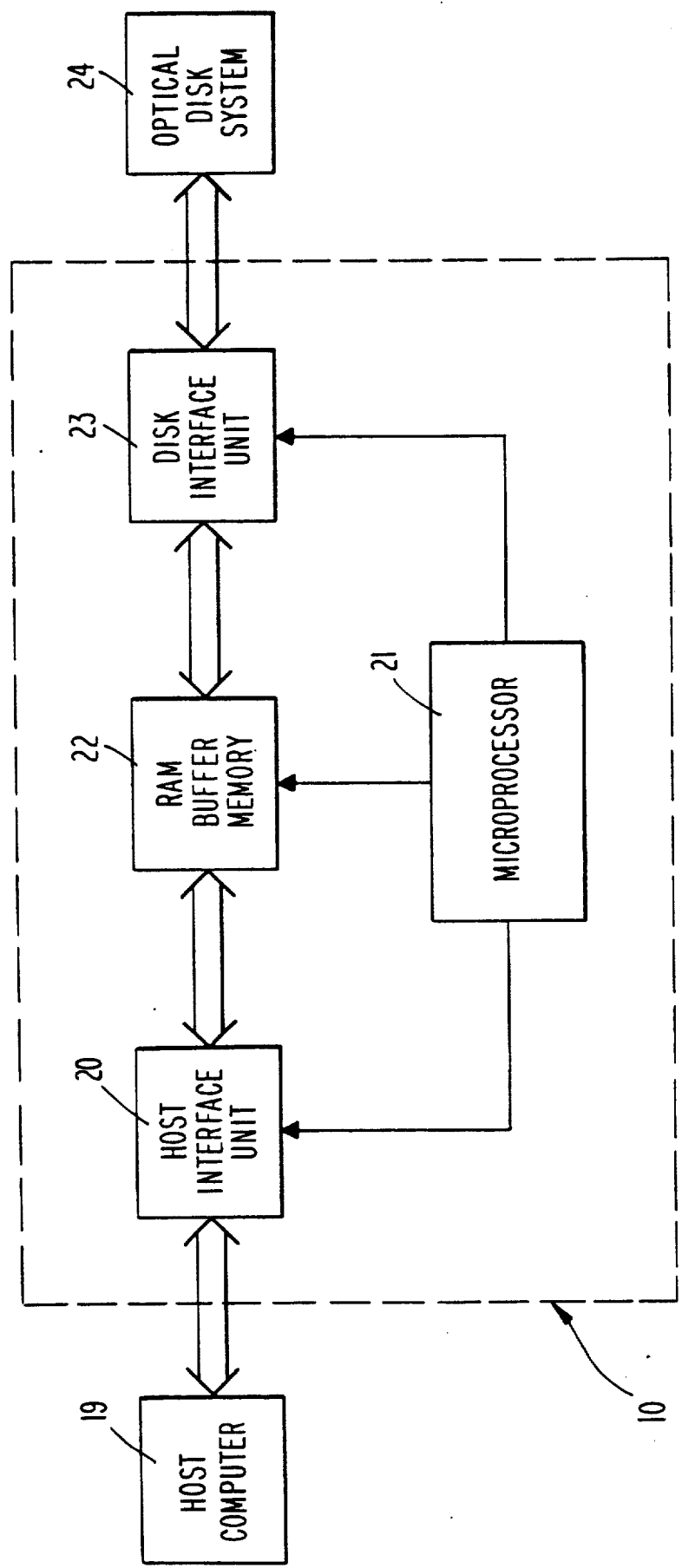
FIG. 1 is a system block diagram including a computer connected for converting magnetic tape data from the computer to data to be placed on an optical disk.

Reference should now be made to FIG. 1 for an overview of the system of the invention. Computer 19 represents any computer, e.g., a Digital Equipment Company VAX 11/780 which provides an output for recording on various conventional peripheral data storage devices. Such devices include magnetic tape drives, e.g., a 9 track drive whereby data is recorded on nine tracks of a tape. In this invention, the computer 19 is operated as if to store conventional nine track magnetic tape data. However, according to one aspect of the invention such data is written onto an optical disk 24 rather than to a tape. In other words, communication between the optical disk and the computer 19 according to the invention is "plug compatible" with the conventional communication between the computer 19 and a conventional tape drive. In this way, no modification to the host's operating system or software is required.

In order to accomplish this, an optical disk controller unit 10 according to the invention is interposed between the computer 19 (which may be substantially any host computer) and the optical disk system 24 (which may likewise be substantially any optical disk storage system). The controller 10 comprises a solid-state RAM buffer memory 22, typically of 1.5 Mbytes capacity, suitable host and disk interface units 20 and 23 respectively, and a microprocessor 21. The interface unit 20 by which the buffer 22 is connected to the computer 19 may implement a conventional tape interface that is, a conventional connection protocol. In this way the controller 10 is connected to the computer 19 as if it were a tape drive. For example, the interface may conform to the well-known "Pertec" interface standard. However, the invention is not thus limited. Similarly, the interface 23 may be any unit suitable for coupling the buffer memory 22 to the optical disk system. For example, the "small computer systems interface" (SCSI) is suitable with many optical disk systems 24.

As indicated, the computer 19, interfaces 20 and 23, buffer memory 22 and optical disk system 24 are connected by wide multibit data buses for fast data transfer; specifically, well-understood Direct Memory Access (DMA) techniques are preferably employed to transfer data into and out of the buffer memory 22. By comparison the microprocessor 21 is connected to the other elements of the controller 10 for control only.

The microprocessor 21 is controlled by software which is FIGS. 6-9 hereof, and provides at least the following functions in accordance with this invention:

(1) Generates information for a high-level directory in microprocessor buffer memory consisting of disk addresses of embedded directory entries;

(2) Constructs embedded directory entries comprising record length information corresponding to the lengths of the records to be stored;

(3) Controls writing of the record data and embedded directory entries to the optical disk; a high-level directory entry including a (4) Writes a high-level directory entry including a table of embedded directory disk addresses to the optical disk.

During reading operations the high-level directory entry is read from the optical disk and used to determine the disk addresses of the embedded directory entries corresponding to the records which are sought for. The embedded directory thus identified and the associated segment of data records are copied from the optical disk into the RAM buffer. The appropriate embedded directory entry is then employed to locate the desired record data within the data segment.

The microprocessor 21 can be any suitable unit; for example, a Motorola model 68010 is suitable. For buffer memory 22, semiconductor memory purchased from Motorola is suitable; however other conventional memory may be used. The "SCSI" interface 23 coupling the microprocessor 21 and optical disk 24 (SCSI is the international standard meaning "small computer systems interface") may be purchased from Applied Controlled Concepts Corporation, Milwaukee, Wisconsin, as model AVME 1686 or from other vendors.

The optical disk drive for the disk 24-1 of system 24 may be one of many different types e.g., an OPT MEM 1000 purchased from OPTIMEM Corporation, Sunnyvale, Calif., which uses conventional optical disks for recording information.

Figure 2:
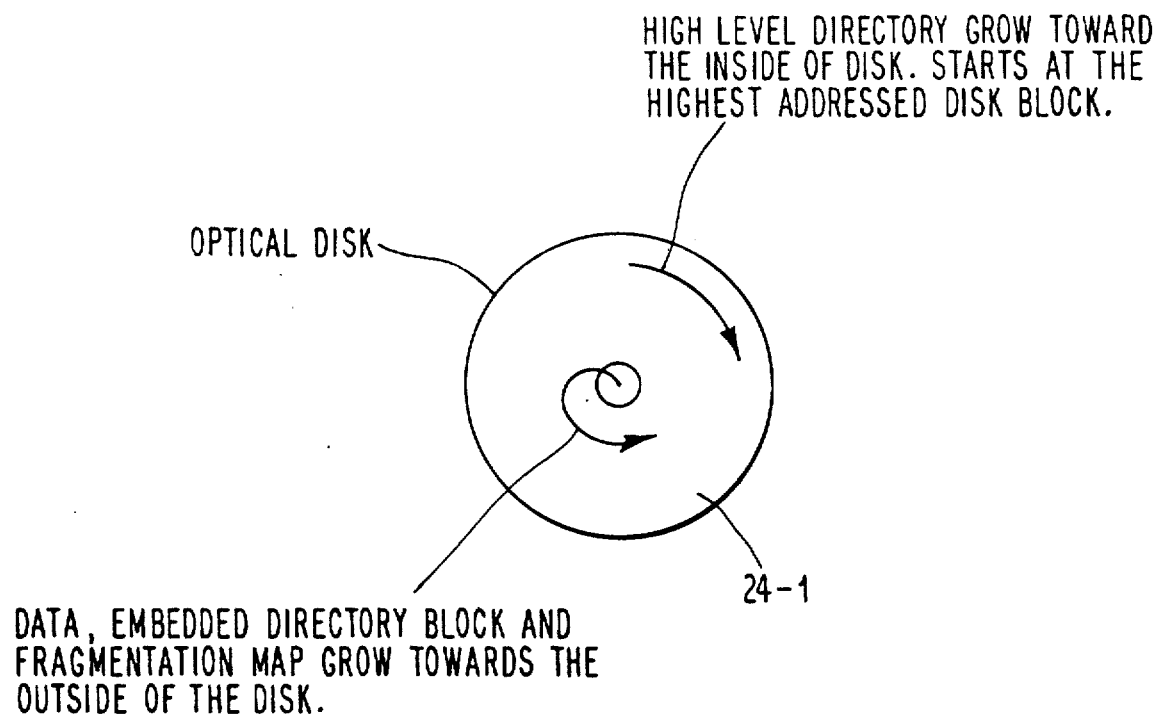
FIG. 2 depicts the overall scheme of writing data to an optical disk according to the invention.

FIG. 2 shows a typical optical disk 24-1 having information, i.e., record data and directory information stored thereon on one continuous track if a spiral track format is used, or on a sequence of tracks if concentric tracks are used on the disk. As indicated, the high-level directory starts at the outermost edge of the disk and moves inwardly, while the data and embedded directories move outwardly. In this way no fixed allocation of space need be made.

Figure 3:
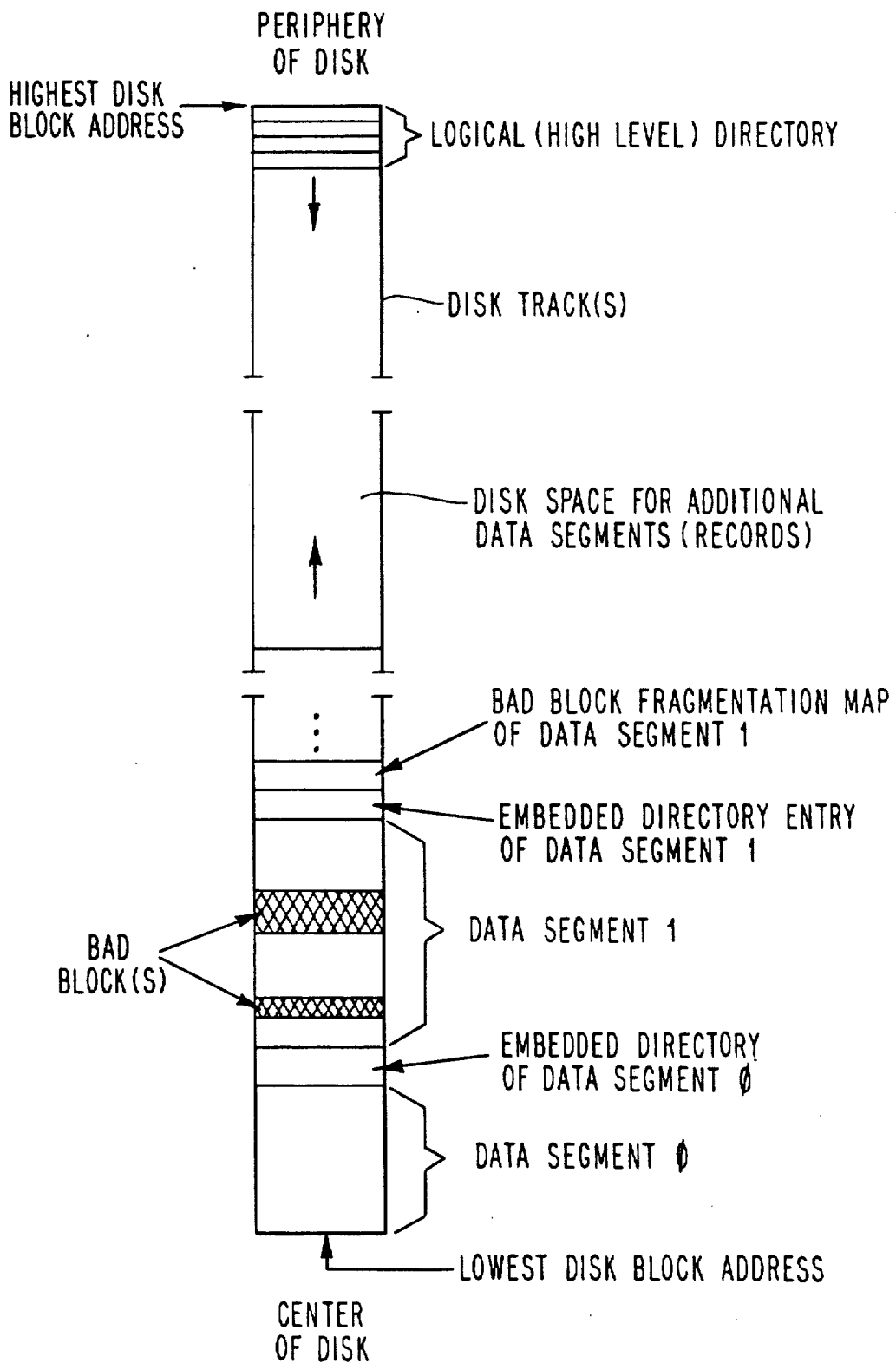
FIG. 3 depicts the physical layout of the data and directories as recorded on an optical disk.

FIG. 3 shows the layout of the entire spiral track. A generally similar arrangement would be employed if a concentric-track format were used. That is, for the purposes of the present invention, the concentric tracks would be treated as a continuous track. It is understood that disks may store data from one or more files, depending on file length. Assuming that an amount of records corresponding to a single file which might have been stored on a single tape is to be recorded on a disk 24-1, FIG. 3 illustrates the typical data record locations and the corresponding directory positions, along with bad disk blocks (unusable disk portions) and bad disk block fragmentation maps pointing out where the bad disk blocks are located in the disk.

In the example shown by FIG. 3, data segment 0 (zero), comprising up to 500 records, is written first, followed by its corresponding embedded directory entry. As noted, the embedded directory comprises a list of the length, in bytes, of the records stored corresponding thereto.

If bad disk block(s) are encountered during attempts to write the data segment to the disk, a bad disk block "fragmentation map" is generated and is recorded on the disk following the embedded directory entry, as indicated in connection with data segment 1 in FIG. 3.

This is repeated as more groups of records are added to the disk. At the end of the writing of each data segment, the sector address of the associated embedded directory block is added to a list in the high-level directory in buffer memory. When the disk recording session is completed, the corresponding high-level directory entry is written to the disk.

Figure 4:
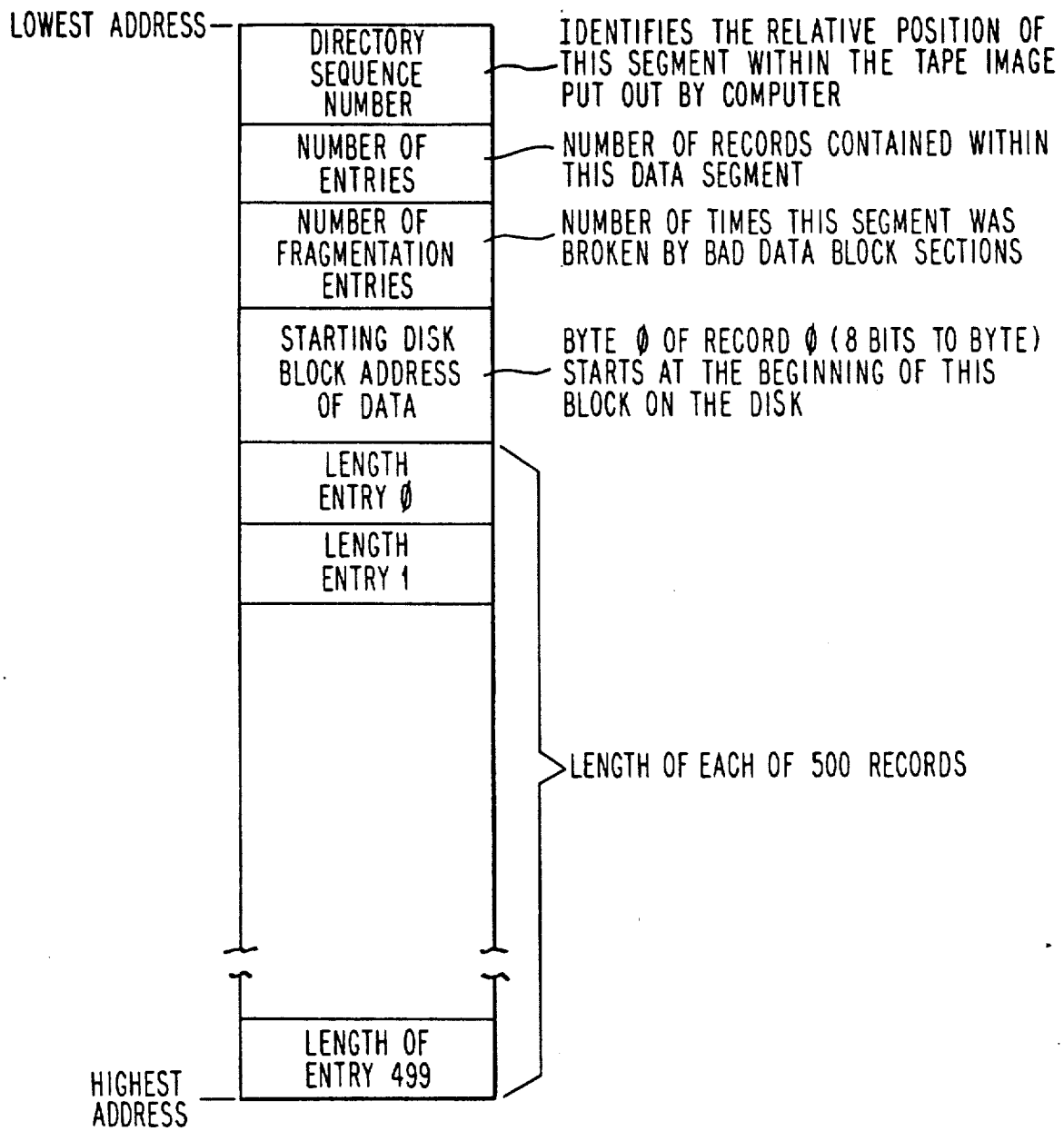
FIG. 4 depicts the physical layout of the information contained in an embedded directory on the track of an optical disk.

Referring to FIG. 4, the structure of each embedded directory block is shown. The first 24 bytes of each 1024-byte embedded directory comprise header information including the number of fragmentation (bad block) entries. The starting address of the first record on the disk is then recorded.

This is followed by 500 2-byte entries, one per record, each comprising a number equal to the length of the corresponding record, that is, a number equal to the number of bytes of data making up each record. Record length information corresponding to 500 records can thus be stored in each 1024-byte embedded directory, occupying one complete sector.

Figure 5:
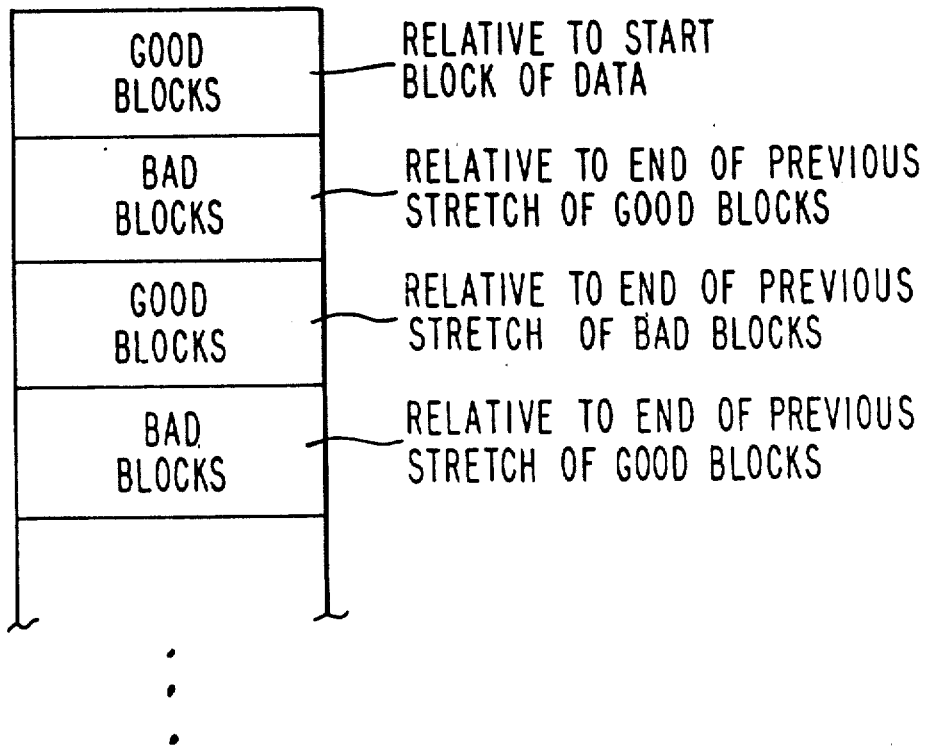
FIG. 5 depicts the physical layout of the information contained in a fragmentation block on a track of an optical disk.

Reference should now be made to FIG. 5 which illustrates a typical fragmentation map. The fragmentation map lists the sequence of good and bad blocks encountered in the preceding data segment. A bad block represents one or more sectors on the disk on which data was detected as having been incorrectly written. Such information is conventionally determined by the optical disk drive system 24 by first writing data and then immediately checking it for correctness. If the data recorded is incorrect, then the disk sector containing this data is considered a bad sector. The fragmentation block map permits one to read out the blocks of good data and disregard the bad blocks of data. In the preferred embodiment the minimum entry size in the fragmentation map is one sector, but this does not limit the invention.

Figure 6:
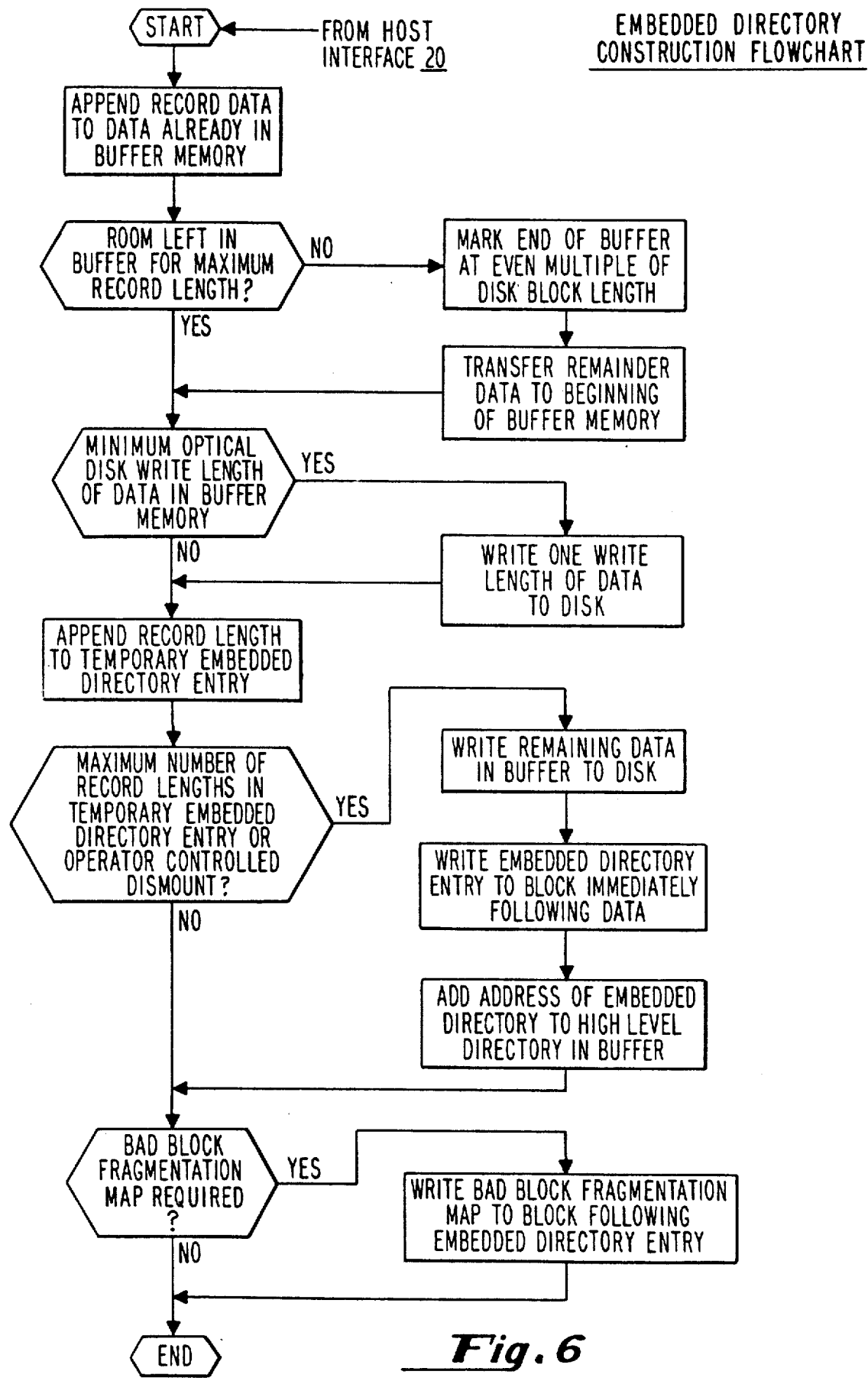
FIG. 6 depicts a flowchart of the software for constructing an embedded directory during a recording operation in which data is written to the optical disk.

FIG. 6 represents a flow chart for program coding to operate the microprocessor 21 to cause the data and generated embedded directories to be written on the disk. When record data is received from the interface 20 connecting the controller 10 to the computer 19, the recording procedure and generation of the embedded directory is begun as previously described. The embedded directory and associated records are written to the disk when the computer operator provides a "Tape Dismount" command, indicating unambiguously that recording operations have been completed. A segment of records and the associated embedded directory can also be written to the disk when a complete segment of 500 records has been stored in the RAM buffer and the embedded directory generated. Other recording intervals are also possible.

Figure 7:
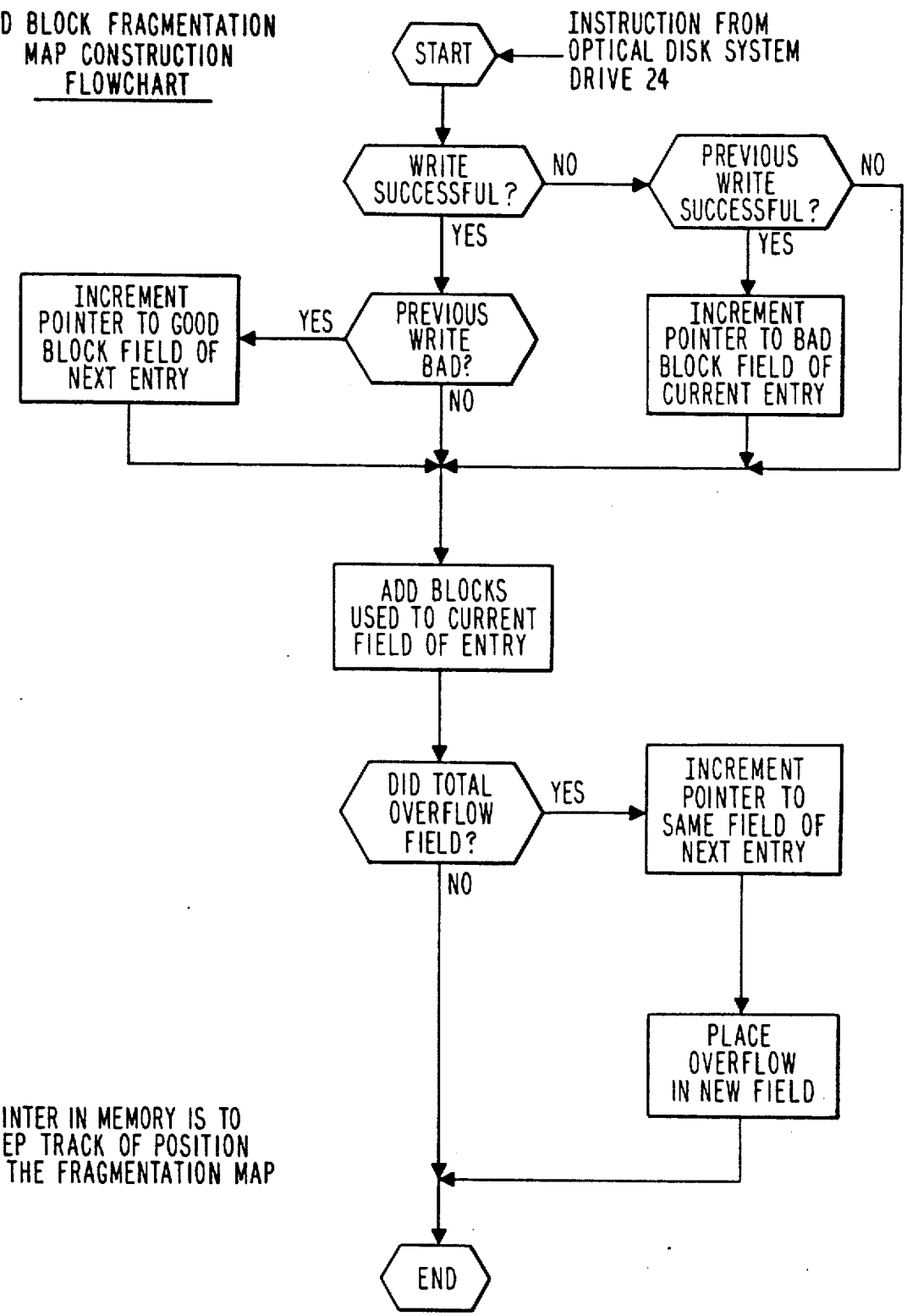
FIG. 7 depicts a flowchart of the software which constructs an embedded fragmentation map during the recording operation.

FIG. 7 represents a flow chart for program coding to generate the bad block fragmentation map. Bad blocks on the disk are determined when the recorded data is checked for correctness. If the data recorded on the optical disk is incorrect, then the disk block portion on which the data was recorded is considered a bad block.

Figure 8:
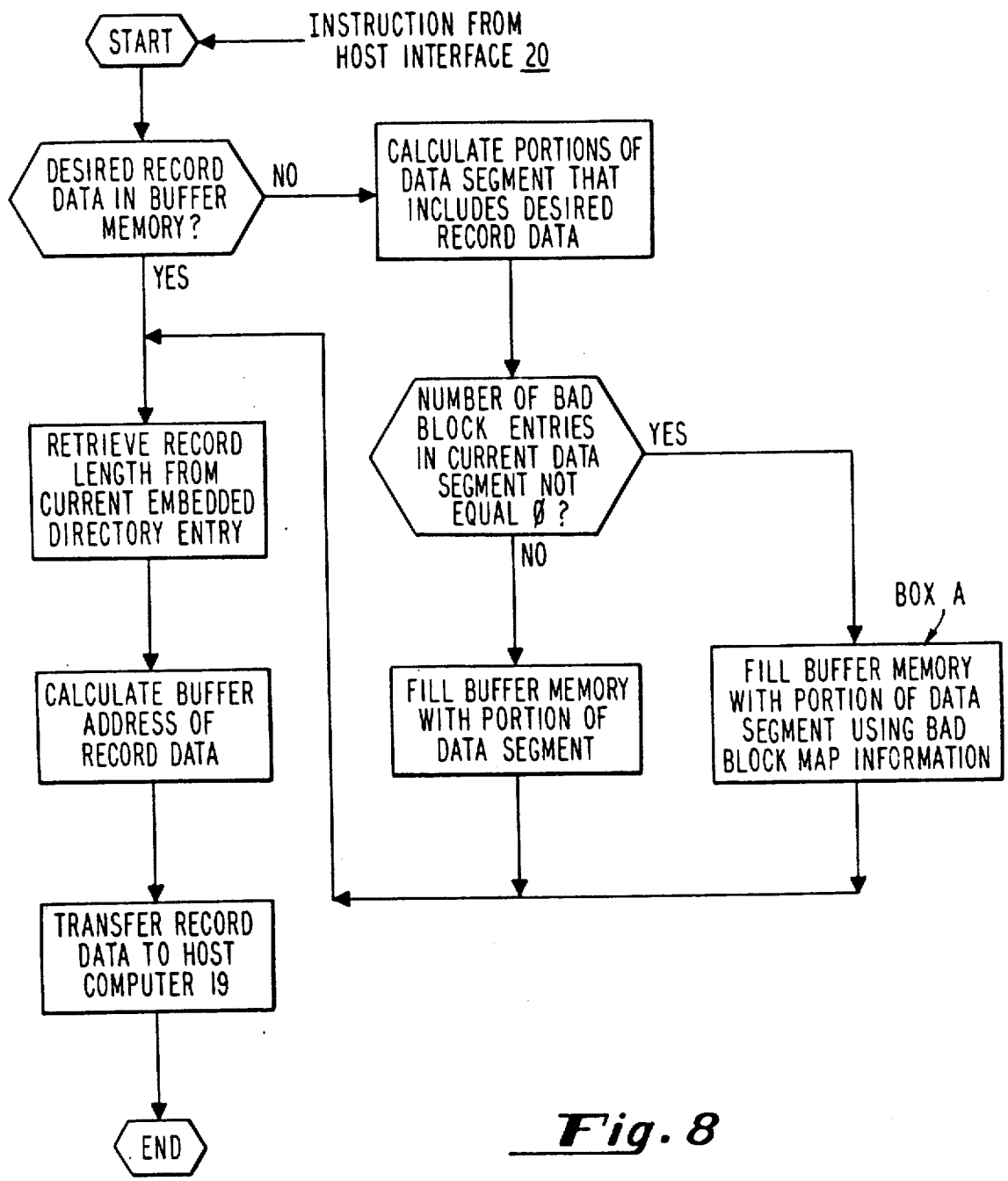
FIG. 8 depicts a flowchart of the software for reading data from the disk.

FIG. 8 represents a flow chart for reading out the record data recorded on the disk. Instructions to read out the disk come from the interface 20 via the computer 19. In essence, the flow chart represents how the records are read out (retrieved) by calculating from the high-level directory and embedded directories where the record data is stored on the disk and then reading out the record data while disregarding the bad blocks based on the fragmentation map.

Figure 9:
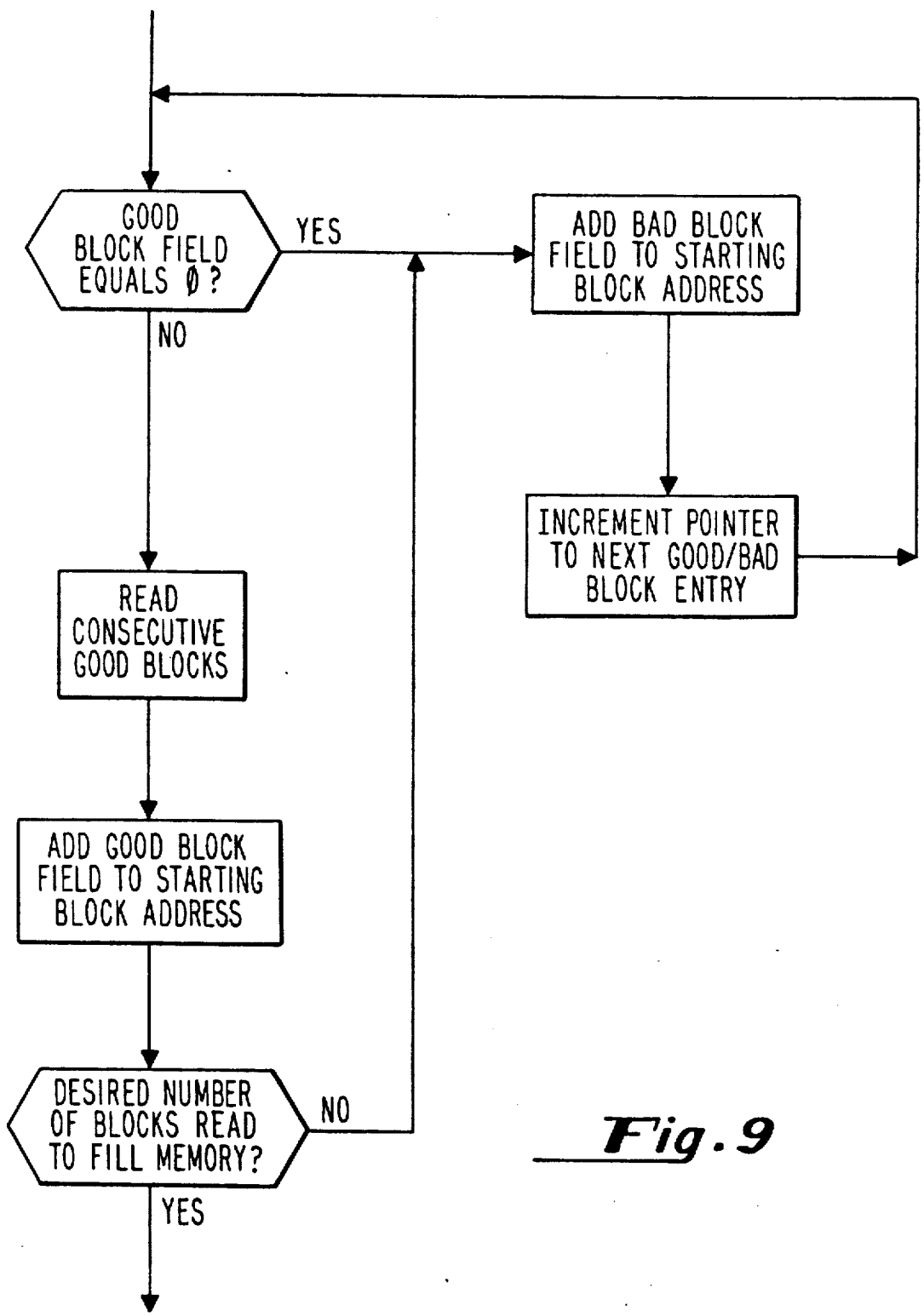
FIG. 9 depicts a flowchart of the software which is used to interpret the fragmentation map during disk readout.

The implementation of the box A of FIG. 8 is accomplished pursuant to the flow chart of FIG. 9. That is, the flow chart of FIG. 9 represents how program coding is generated to implement the block on FIG. 8 called "Fill Buffer Memory with Portion of Data Segment Using Bad Block Map Information".

The invention having thus been described, certain of its additional features and advantages, especially those added to the disclosure by the present continuation-in-part application, can be more readily discussed.

FIG. 1 of this application shows that RAM buffer memory 22 is controlled by the microprocessor 21. The buffer memory 22 is used to store data received from the host 19 prior to storage on the optical disk in a write operation, and to store data copied from the disk in a read operation prior to supply of the data from the disk to the host.

In a write operation, that is, when data is to be stored on the optical disk 24, the data is initially stored in the buffer memory 22 and is only written to the disk when a certain quantity of data has been stored. This has several advantages. For example, in some tape operations it is desirable to follow the last record written with an indication that the last record has been written to the tape. This can readily be accomplished in a tape system. In order that plug compatibility can be provided in the optical disk system according to the invention, the same function must obviously be provided.

More particularly, it is customary to write an "end of tape" mark to the tape after writing the last data record to the tape. Typically this mark may consist of two file marks in succession. In this way, when the "end of tape" mark is detected, the drive can stop searching for more records. However, in practice, an operator may remove a reel of tape at any time without necessarily first causing an "end of tape" mark to be written. Accordingly, it is conventional to automatically write an "end of tape" mark to the tape at the conclusion of all tape writing operations; if further writing then is directed by the host, the "end of tape" mark is simply erased and overwritten. In this way, whenever the tape is removed, an "end of tape" mark is present, but only one "end of tape" mark is present per tape.

The above sequence relies on erasure of the unneeded "end of tape" marks. Erasure is not possible on presently available optical disks. Therefore, according to one aspect of the present invention, in order to preserve plug-compatibility of an optical disk storage system with a tape drive, records are not written to tape immediately when recorded from the host. Instead, they are stored in RAM buffer 22. When the records are later written to the disk, for example, upon receipt of a "tape dismount" command, the end-of-tape pair of file marks is simply appended to the last record. According to one aspect of the invention, no "end-of-file" mark, as used in some tape systems, is needed, since each embedded directory pertains only to records from a single file.

If convenient, a "file" as thus defined (i.e., up to 500 records, all listed in a single embedded directory) can be divided into "subfiles" by "file marks", that is, zero-length entries, in the embedded directory. These file marks can readily be detected upon reading of the records form the disk. This allows convenient accessing of the subfiles by an application program.

Therefore, according to a further aspect of the invention, data is only written to the disk after it has been stored in a random-access memory comprised by the storage system for at least a minimum period of time, to allow the data to be "edited" under control of the microprocessor.

Another advantage of buffering all data records to be stored in the write operation is that the size of the "blocks" of information, into which the records and embedded directories are divided for actual transfer to the optical disk, can readily be chosen to match the characteristics of the particular drive. For example, it is often convenient to transfer data to the disk in blocks equal in length to the capacity of a single disk track, for convenient verification of the data written. According to the invention the information transferred can readily be divided into blocks of optimal size. In this way actual data throughput can be substantially increased over a non-optimized arrangement.

In particular, according to an important aspect of the invention, the optimization of block sizes thus provided allows a single disk controller design to be conveniently and economically employed with differing optical disk drives having differing block sizes and sector sizes. The choice of the block size is typically made upon manufacture of the controller, when it is programmed for use with a class of functionally similar hosts and a class of functionally similar optical disk storage units.

All data being transferred from the disk to the host is also stored in the buffer memory 22 in a read operation.

Conventionally, when a host application program desires to obtain data stored on tape, it issues a "Mount Tape" command. A human operator then mounts the appropriate reel of tape and provides an indication that this has been accomplished. Only then does the host actually seek to read data from the tape, by issuing a "next record" or "next file mark" command. Again, in order to provide plug compatibility, the optical disk storage system of the invention must respond to these commands as would a tape drive.

According to the invention, in response to a "Mount Tape" command, the high level directory is consulted to determine the location of the first embedded directory corresponding to the named file or the tape number (typically provided as part of the Mount Tape command). A large quantity of data corresponding to the particular file (i.e. which would have been stored on the physical tape, but which according to the invention is stored on the optical disk) is read into the buffer memory. The disk controller may then provide a "Tape Mounted" or similar signal to the host, if required by the host's tape interface communication protocol. When the host subsequently desires to read a record, because the data has already been stored in the buffer memory, the particular record sought by the host can be retrieved substantially immediately. When a predetermined quantity of the data stored in the buffer memory has thus been transferred to the host, additional data can be retrieved from the optical disk and stored in the buffer memory in advance of any further requests by the host. This further improves efficiency of system operation employing an optical disk storage system according to the invention.

A further improvement made by the invention relates to the fact that in some cases, contrary to the usual practice of the art, it is desired to overwrite records which are stored on magnetic tape. That is, suppose a long sequence of individual records have been previously written to a particular tape. An individual record may be desired to be overwritten by an application program. This is simple on tape, although potentially time-consuming, since the individual record must be located. The advantage of course is that the records are always correct and in sequence.

Such overwriting is not possible if the records are stored on present-day, nonerasable optical media. According to the invention, and in order to preserve plug compatibility, when a record having previously been written to optical disk is to be overwritten pursuant to a command to that effect received from the host, the microprocessor stores the new version of the record in question at a predetermined location on the disk. Such additional entries are listed by a "super-directory" entry which indexes such entries by file name. The superdirectory is stored at a predetermined location on the disk, typically as part of the high level directory. When the file is later requested, the high level directory is consulted as usual. If an added superdirectory entry is located, indicating that one or more of the records has been supplanted by one of the newly written records, the new record is substituted for the obsolete record prior to supply of the record or records to the host. The fact that all data is stored in the RAM buffer prior to supply to the host in the read operation greatly facilitates such operations, as will be appreciated by those of skill in the art. In this way plug compatibility is preserved and the capability of "apparent overwriting" is provided.

As indicated above, according to one aspect of the invention the RAM buffer memory 22 is configured as a "circular buffer". At all times there exists a read pointer and a write pointer to the total solid state buffer memory (which may be on the order of 1.5 megabytes total capacity). Data to be written to the disk is stored in the RAM buffer memory 22 beginning at the location indicated by the input pointer, which is updated as the data is stored. When a substantial quantity of data has been stored between the input and output pointers, a quantity of the data, which may approximate the amount stored between the input and the output pointers, is written to the optical disk, as described above. The output pointer is then moved appropriately. Thus the data itself is not moved within the buffer; its "circular" nature is implemented using the two pointers, which "wrap around" the end of the buffer address space if it is reached, first by the input and later by the output pointers. Other memory organizational schemes are considered to be within the skill of the art.

Thus, when data is to be stored on the optical disk, it is initially stored in the RAM buffer memory 22 and all the calculations required to generate the embedded directories described above are performed. The embedded directories are stored in the RAM buffer memory 22 separately from the corresponding data records. When all of the data records pertaining to a particular embedded directory have been written to the disk, the embedded directory is written to the disk after the corresponding data records, all as described above.

Correspondingly, as indicated above, when a "mount tape" instruction is received from host 19, a large quantity of data, typically as much as one complete 500-record segment, is read into the RAM buffer memory 22. When the host subsequently requests a particular record, the calculations described above are performed to locate the appropriate data record in the RAM buffer memory 22. The data records are then accordingly supplied to the host directly. In effect, to locate a particular record it is simply necessary to add the numbers of bytes stored with respect to the preceding records in the segment to the address in the buffer memory 22 of the first record of the segment. The result is the address in the buffer memory 22 of the record sought. In addition to providing very efficient response to host requests, this feature of the invention also has the advantage that only long sequences of data are ever read from the optical disk itself into the memory 22, thus avoiding inefficiency due to the slow mechanical response time of the optical disk as described above.

Storage of the data in the buffer in both the read and write processes also has other advantages. For example, discontinuous portions of a particular data set, that is, which have been written to separate portions of the optical disk, can readily be joined to one another in the solid state memory prior to supply to the host. In this way, the optical disk can emulate a tape to which successive portions of a data set have been written at different times. Similarly, this aspect of the design of the system of the invention allows emulation of a "delete record" option provided on the magnetic tape simply by rendering the particular record to be deleted from the tape unavailable. Of course, according to the invention the corresponding "undelete" option is also available, which cannot be provided in connection with an actual tape. One can similarly rename files stored on the optical disk simply by causing the appropriate data set name in the high level directory to be superceded. Entire tapes may similarly be effectively deleted, undeleted or renamed, simply by rewriting the corresponding high level directory entries.

Use of the RAM buffer memory 22 to buffer all data transfers to and from the optical disk 24 enables a single design of the optical disk controller 10 of the invention to be used efficiently with various types of hosts, various types of optical disks, and in applications not requiring tape emulation per se. More specifically, a principal advantage of optical disk data storage is that data cannot be erased. It is highly desirable for archival purposes that data not be erasable from the medium in which it is stored. Provision of the random access buffer memory as a central step in the read and write processes according to the invention allows this archival quality to be emphasized and gainfully employed without rendering the entire process inefficient and time consuming.

Similarly, the controller of the invention and the data storage concepts implemented thereby, consisting of the high-level directory, embedded directory, and variable-length data record storage structure, will be useful in adapting optical disk media as a sui generis data storage medium, that is, in which emulation of a pre-existing memory device will not be required. The architectural flexibility provided by the inventive data organization will be very useful to systems designers and software developers. The employment of the RAM buffer in all data transfers to and from the disk, together with the super-directory concept and the archival nature of the media, will allow efficient operations and convenient host access to files while permitting "historical reconstruction" of files.

There have recently been announced allegedly erasable optical media. It is to be anticipated that the devices and methods of the invention will be useful with these devices as well. Accordingly, the appended claims are not to be limited to nonerasable optical media, except where their language clearly so requires.

The invention also has use in connection with "jukebox" systems, in which an automated robotic device is provided to physically select an optical disk from a storage location, such as a shelf, and place it on a disk drive in response to a host command. Such systems are available from Cygnet Systems, Inc., Sunnyvale, Calif., as the Series 1800 Jukebox, and from Sony Corp. as the WDA-3000-10 Writeable Disk Autochanger. According to the invention, employment of such a "jukebox" system allows emulation of an automated tape library.

In this case, a jukebox device replaces the optical disk storage system 24 of FIG. 1, and an additional storage device, e.g., a "hard" magnetic disk, is added to the control unit 10 of the invention. This additional storage device may be used to store information relating the names or accession numbers of tapes to the optical disks on which the corresponding records are stored, so that in response to a "Mount" request for a tape, the corresponding disk is placed on the drive and accessed using the high level and embedded directory information, all as described above. In a somewhat more elaborate embodiment, the additional storage device can store the high-level directory information. In this embodiment, a request for a file is first used to command the jukebox to place the corresponding disk on the drive, and then to access the correct records stored thereon.

Addition of this "jukebox" system to the system of the invention is considered to be within the skill of the art.

While a preferred embodiment of the invention has been described, it will be understood by those of skill in the art that modifications and improvements to the above described exemplary embodiment of the invention may be made without departing from the spirit and scope thereof, as will be apparent to those skilled in the art, and the claims are intended to cover such modifications and improvements.

I claim:

1. An optical media data storage system, comprising:
host interface means for connection to a host computer, said host interface means comprising means for receiving a sequence of data storage commands to control a magnetic media data storage device from said host;
buffer memory means coupled to said host interface means for receiving data transferred from said host which is to be stored on optical disk, and for supplying data which has been stored on optical disk to said host;
optical media storage means, comprising an optical disk for storing data thereon, and connected to said buffer memory means for storing data received from said buffer memory means and for supplying data stored therein to said buffer memory means;
microprocessor means, connected to said host interface means, buffer memory means, and optical media storage means, for responding to said sequence of commands received from said host interface means and for controlling data storage and retrieval operations of said buffer memory means and said optical media storage means, responsive to said sequence of commands; and
a high level directory relating one or more record directories to a particular host data file constructed by said microprocessor means and stored in said buffer memory means;
wherein all data stored by said optical media storage means is stored in said buffer memory means prior to storage on said optical media storage means and prior to supply of said data from said optical media storage means to said host;
wherein while said data is stored in said buffer memory means, prior to storage on said optical media storage means, said data is organized by said microprocessor into discrete groupings or segments, and at least one record directory is constructed, each said record directory consisting of information pertaining to lengths of the data records contained in a single discrete group or segment of data;
wherein said segments, their associated record directories and said high level directory are transferred from said buffer memory to said optical media storage means and stored on said optical disk;
wherein said information contained in said record directory pertaining to length of an individual data record is used to locate within a given data segment the particular record sought by the host computer; and
wherein said segments are recorded onto said optical disk contiguously and interspersed with said record directories.

2. The system of claim 1 wherein said high level directory is stored on said optical disk beginning from one end of a track on the optical disk and the record directories with their associated segments are written beginning from the opposite end of said track.

3. The system of claim 2 adapted to respond to a sequence of data storage commands conventionally used to control a magnetic media data storage device.

4. An optical media data storage system, comprising:
host interface means for connection to a host computer, said host interface means comprising means for receiving a sequence of data storage commands conventionally used to control a magnetic media data storage device from said host;
buffer memory means coupled to said host interface means for receiving data transferred from said host which is to be stored on optical disk, and for supplying data which has been stored on optical disk to said host;
optical media storage means, comprising an optical disk for storing data thereon, and connected to said buffer memory means for storing data received from said buffer memory means and for supplying data stored therein to said buffer memory means; and
microprocessor means, connected to said host interface means, buffer memory means, and optical media storage means, for responding to said sequence of commands received from said host interface means and for controlling data storage and retrieval operations of said buffer memory means and said optical media storage means, responsive to said sequence of commands;
wherein all data stored by said optical media storage means is stored in said buffer memory means prior to storage on said optical media storage means and prior to supply of said data from said optical media storage means to said host;
wherein while said data is stored in said buffer memory means, prior to storage on said optical media storage means, said data is organized by said microprocessor means into discrete groupings or segments, and at least one record directory is constructed, each said record directory consisting of data pertaining to lengths of the data records contained in a single discrete group or segment of data;
wherein said supplied to said host interface means by said host computer is organized into a sequence of records by said microprocessor means; and
wherein information pertaining to individual data records which is contained within each said record directory defines the length of at least one record of a single file which induces such records.

5. The system of claim 4 further comprising a high level directory relating each file to a corresponding record directory or set of record directories is accessed to determine the location or sector address of the corresponding record directory or directories and records on the optical disk each time one or more records from a particular file are sought.

6. The system of claim 5 wherein after said high level directory has been accessed to determine the location or sector address of the first record directory for a particular file, a quantity of data at least including the particular record directory and a number of the corresponding records located contiguously with respect to said record directory are read from the optical disk system by means of the disk interface unit and copied to the buffer memory, and the information pertaining to the length of each of the records which are stored in the corresponding record directory is employed by the microprocessor means to determine the particular record or records sought by the host from the quantity copied to the buffer memory.

7. The system of claim 6 wherein said high level directory is stored at a predetermined physical location specified by said microprocessor on said disk.

8. The system of claim 6 wherein said record directories containing data pertaining to each of said records are stored in close physical proximity to the corresponding records on the disk.

9. The system of claim 5 wherein the information stored in said record directories pertaining to each of the records consists of the length of each record.

10. The system of claim 9 wherein a particular record of a sequence of records stored with respect to a given directory is located by counting the number of bytes of data determined in accordance with the record length information, beginning from a known starting point in said sequence of records.

11. The system of claim 5, further comprising means for storing information relating to the status of the individual records stored by the optical disk, and to the relationship between successive portions of a single file not stored contiguous to one another on the optical disk.

12. The system of claim 11 wherein said microprocessor means is operatively connected to both said optical media storage device and to said buffer memory means for the purpose of controlling the transfer of said records between said buffer memory means and said optical media storage means.

13. The system of claim 5 wherein said buffer memory is connected to said optical media storage means through disk interface means to facilitate the transfer of data.

14. The system of claim 4 wherein said records are not of predetermined length.

15. The system of claim 4 wherein said host interface means is connected to said host computer at a host communication port of said host computer adapted for communication with a magnetic media storage device and is adapted to respond to a sequence of data storage commands identical to a sequence of such commands employed by said host to communicate with a magnetic media storage device.

16. The system of claim 4 wherein said buffer memory comprises solid-state random-access-memory (RAM) for efficient accessing and editing by said microprocessor of buffered data during data transfer operations between said optical media data storage system and said host computer.

17. The system of claim 16 which further comprises input and output pointer means for accessing said RAM, new records being stored at the location indicated by the input pointer, and copied to the optical media storage device means when said RAM is filled to a predetermined degree indicated by said output pointer, whereafter said pointers are updated.

18. A method for storing data, said data being organized into a sequence of records with associated record directories on an optical media storage device wherein said records are not limited to a specific length, except to the extent that they may not exceed the largest record length value which may be expressed in one of the associated record directories said system comprising a buffer memory, a host interface means, and an optical media storage device, means for connecting the buffer memory to the host interface means and to the optical media storage device, and microprocessor means for controlling the transfer of data therebetween.

said method comprising the following steps performed in response to a request from a host computer to store a sequence of records;

receiving said sequence of records at said host interface means and transferring said sequence of records to said buffer memory means;

storing said sequence of records in said buffer memory means;

creating a record directory in said buffer memory means;

associating a record directory with up to a predetermined number of said records;

storing said sequence of records and said record directory on said optical media storage device;

generating a high level directory relating one or more record directories to a sequence of data records in response to a request from the host computer to store data which identifies the record directories and contains information concerning the locations of the record directories on the optical media storage device.

copying all of the records associated with the record directory with which the particular record or records sought by the host are associated into the buffer memory means;

employing the record directory to locate the particular record or records sought by the host; and transferring the record or records sought, to the host through the host interface.

19. The method of claim 18 wherein said record directory comprises information concerning the lengths of records defined by the number of bytes of data contained within each record.

20. The method of claim 19 comprising the further step of organizing the records into discrete groupings or segments prior to storage on said optical media storage device, said discrete groupings or segments each consisting of the records associated with a particular record directory.

21. The method of claim 20 wherein the particular record sought by the host is located in the buffer memory by counting out a number of bytes of data corresponding to the total length of the preceding records from a predetermined starting point.

22. The method of claim 21 wherein the predetermined starting point is the end of the segment stored on the optical media storage device prior to the segment containing the records sought by the host.

23. The method of claim 22 wherein all of the records associated with a predetermined record directory pertain to a single user file.

24. The method of claim 23, comprising the further steps, performed when a request is received by said system from said host computer by means of said host interface unit for one or more particular records belonging to a particular named user file, of accessing the high level directory to determine the locations of the record directories associated with records from that file, and copying at least the first of said record directories and the associated records into the buffer memory.

25. The method of claim 24 comprising the further steps of:

accessing said high level directory by said microprocessor after one or more records associated with a record directory have been supplied to the host determining whether there are any further record directories associated with the particular file; and if there are any further record directories associated with the particular file, then copying into buffer memory at least one further record directory and its associated record or records which relate to the particular file.

26. The method of claim 23, wherein the high level directory is stored on the optical media storage device at a predetermined location.

27. The method of claim 26, wherein the record directories are stored on the optical media storage device contiguously with the segment of data records to which they contain record length information.

28. The method of claim 18, wherein said optical media data storage system will respond to a command of said host directing that a particular record be overwritten with a new version thereof, said response comprising the further steps of storing the new version of the record, and maintaining a list indicating the correspondence between the new and prior versions of the apparently overwritten record.

29. The method of claim 18, wherein said optical media storage system is connected to a host computer at an existing port by which said host conventionally communicates with a magnetic media storage device, and said microprocessor responds to conventional commands received from the host for data storage and retrieval of data on said magnetic media storage device without the need to modify either the host hardware or software by utilizing said system of embedded directories containing information relating to the length of individual records so as to efficiently locate a particular record within a given data segment in response to a series of host commands.

30. A method for storage of a sequence of data records of varying length on an optical disk storage device, said device comprising an optical disk describing a continuous data storage track or a continuous sequence of data storage tracks divided permanently into sectors, whereby raids disk is only accessible by associated read/write means at the beginning of said sectors on said tracks, comprising the steps of:

receiving said sequence of data records to be stored from a source thereof, and storing the same temporarily in buffer memory means;

generating a record directory associated with up to a predetermined number of said data records, and consisting principally of information concerning the length of the records associated with the record directory;

generating a high level directory relating one or more record directories to a sequence of data records;

writing said sequence of records to said optical disk in sequence, beginning at one of said sector boundaries, and extending therefrom essentially continuously along said continuous track or continuous sequence of tracks;

writing said record directory to said optical disk contiguously with respect to said sequence of records and at a location fixed with respect to one of said sector and one of said tracks; and writing said sequence of records and said record directories to said disk beginning from one end of the data storage track or tracks and writing said high level directory to said disk beginning from the opposite end of said data storage track.

* * * * *